US008948012B2

(12) United States Patent
Vataja

(10) Patent No.: US 8,948,012 B2
(45) Date of Patent: Feb. 3, 2015

(54) SYSTEM AND METHOD FOR INTERACTIVE SESSION PROVISION

(75) Inventor: Timo Vataja, Tampere (FI)

(73) Assignee: Nokia Corporation, Espoo (FI)

( * ) Notice: Subject to any disclaimer, the term of this patent is extended or adjusted under 35 U.S.C. 154(b) by 1686 days.

(21) Appl. No.: 11/323,852

(22) Filed: Dec. 29, 2005

(65) Prior Publication Data

US 2007/0208859 A1 Sep. 6, 2007

(51) Int. Cl.
*G06F 15/16* (2006.01)
*H04L 29/08* (2006.01)
*H04L 29/06* (2006.01)
*H04L 9/08* (2006.01)

(52) U.S. Cl.
CPC ............ *H04L 67/34* (2013.01); *H04L 65/1069* (2013.01); *H04L 9/0819* (2013.01)
USPC ................. 370/236; 717/177; 463/29; 463/42

(58) Field of Classification Search
USPC .................. 370/236, 360, 463, 486; 725/135; 709/203, 204, 227, 228; 717/177; 463/42, 29, 40, 41
See application file for complete search history.

(56) References Cited

U.S. PATENT DOCUMENTS

| | | | |
|---|---|---|---|
| 5,738,583 A * | 4/1998 | Comas et al. | 463/40 |
| 5,956,505 A * | 9/1999 | Manduley | 713/1 |
| 6,383,075 B1 * | 5/2002 | Jeong et al. | 463/39 |
| 6,918,108 B2 * | 7/2005 | Rajaram | 717/126 |
| 7,828,661 B1 * | 11/2010 | Fish et al. | 463/42 |
| 2001/0007996 A1 * | 7/2001 | Dulai et al. | 709/225 |
| 2002/0083148 A1 * | 6/2002 | Shaw et al. | 709/214 |
| 2002/0086732 A1 * | 7/2002 | Kirmse et al. | 463/42 |
| 2002/0143959 A1 * | 10/2002 | El-Baze et al. | 709/228 |
| 2003/0007464 A1 * | 1/2003 | Balani | 370/310 |
| 2003/0032417 A1 * | 2/2003 | Minear et al. | 455/419 |
| 2004/0128690 A1 * | 7/2004 | Zohar Ariely | 725/86 |
| 2004/0185881 A1 * | 9/2004 | Lee et al. | 455/466 |
| 2004/0192366 A1 * | 9/2004 | Lai et al. | 455/519 |
| 2004/0198403 A1 * | 10/2004 | Pedersen et al. | 455/517 |
| 2005/0004995 A1 * | 1/2005 | Stochosky | 709/219 |
| 2005/0278420 A1 * | 12/2005 | Hartikainen et al. | 709/203 |
| 2006/0148568 A1 * | 7/2006 | Schultz et al. | 463/42 |
| 2006/0195832 A1 * | 8/2006 | Chandley et al. | 717/168 |
| 2007/0054739 A1 * | 3/2007 | Amaitis et al. | 463/42 |
| 2010/0173695 A1 * | 7/2010 | Hutcheson et al. | 463/23 |

\* cited by examiner

*Primary Examiner* — Paul H Masur
(74) *Attorney, Agent, or Firm* — Locke Lord LLP

(57) ABSTRACT

Systems and methods applicable, for instance, in interactive session provision. One or more nodes and/or other computers might, for example, provide to one or more other nodes and/or other computers the ability to employ certain software for an interactive session. A node and/or other computer providing the ability might, for instance, provide to a node and/or other computer receiving the ability software to be used in the interactive session, and/or one or more appropriate keys. A node and/or other computer that has received the ability might, for example, lose the ability with interactive session termination.

28 Claims, 6 Drawing Sheets

SYSTEM AND METHOD FOR INTERACTIVE SESSION PROVISION

FIELD OF INVENTION

This invention relates to systems and methods for interactive session provision.

BACKGROUND INFORMATION

In recent times, there has been an increase in using nodes and/or other computers in ways that involve connection with other nodes and/or other computers.

For example, many individuals have come to prefer gaming that involves connection among nodes and/or other computers over other forms of gaming. As another example, many individuals have come to prefer communications that involve connection among nodes and/or other computers over other forms of communications.

Accordingly, there may be interest in technologies applicable, for instance, in such use of nodes and/or other computers.

SUMMARY OF THE INVENTION

According to embodiments of the present invention, there are provided systems and methods applicable, for instance, in interactive session provision.

For example, in various embodiments one or more nodes and/or other computers might provide to one or more other nodes and/or other computers the ability to employ certain software for an interactive session.

A node and/or other computer providing the ability might, in various embodiments, provide to a node and/or other computer receiving the ability software to be used in the interactive session, and/or one or more appropriate keys. A node and/or other computer that has received the ability might, in various embodiments, lose the ability with interactive session termination.

DETAILED DESCRIPTION OF THE INVENTION

General Operation

According to embodiments of the present invention, there are provided systems and methods applicable, for instance, in interactive session provision.

For example, in various embodiments in the case where nodes and/or other computers participate in an interactive session with one another (e.g., an interactive session employing Session Initiation Protocol (SIP)), one or more of the nodes and/or other computers might provide to one or more others of the nodes and/or other computers the ability to employ certain software including, but not limited to, audio (e.g., music clips), image and/or video files, for the session. Such software might, in various embodiments, be software owned by a user of a node and/or other computer providing the ability, but not owned by a user of a node and/or other computer receiving the ability.

The ability might be provided in a number of ways. For example, in various embodiments a node and/or other computer providing the ability might provide to a node and/or other computer receiving the ability software (e.g., gaming and/or communications software) to be used in the interactive session. As another example, in various embodiments a node and/or other computer providing the ability might alternately or additionally provide to a node and/or other computer receiving the ability one or more appropriate keys.

A node and/or other computer that has received the ability might, in various embodiments, lose the ability with interactive session termination (e.g., SIP termination). For example, in various embodiments the software used in the interactive session might be removed from the node and/or other computer that has received the ability. Alternately or additionally, in various embodiments one or more appropriate keys might be removed from the node and/or other computer that has received the ability.

Various aspects of the present invention will now be discussed in greater detail.

Initial Operations

According to various embodiments, in the case where the users of one or more nodes and/or other computers (e.g., wireless nodes and/or other computers) desire to participate in an interactive session employing software not owned by all of the users (e.g., software owned by only one of the users), one or more initial operations may be performed. Such an interactive session might, for instance, be a gaming and/or communications (e.g., voice, video, and/or chat) session during which, e.g., audio, image and/or video file(s) may be shared, and/or might employ Session Initiation Protocol (SIP).

Figure 1:
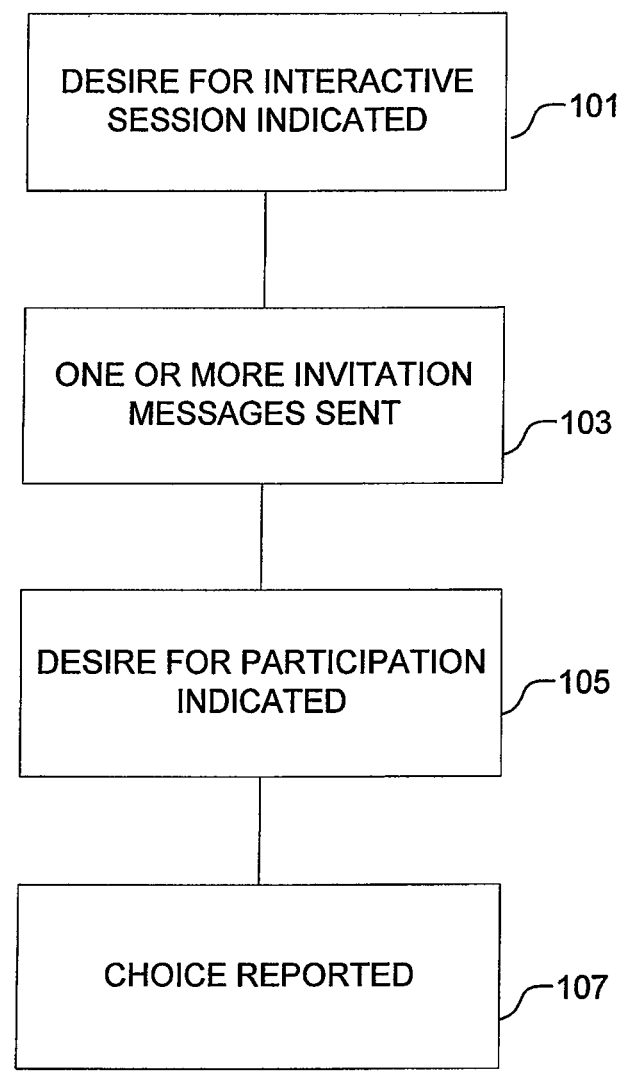
FIG. 1 shows exemplary steps involved in initial operations according to various embodiments of the present invention.

With respect to FIG. 1 it is noted that, for example, an initiating user might indicate to her node and/or other computer (e.g., via a GUI and/or other interface provided by her node and/or other computer) a desire for an interactive session involving her node and/or other computer and one or more other nodes and/or other computers (step 101). Such indication by the initiating user might, for instance, include specification of software to be employed in the session, and/or of other users and/or nodes and/or other computers to participate in the session. Such an initiating user might, in various embodiments, be a user owning the software to be employed in the interactive session. Alternately or additionally, such an initiating user might, in various embodiments, not be a user owning the software to be employed in the interactive session.

In various embodiments, one or more invitation messages might be sent from the node and/or other computer of the initiating user to one or more other nodes and/or other computers in accordance with the indication by the initiating user (step 103). Moreover, in various embodiments users of nodes and/or other computers receiving the invitations might specify to their nodes and/or other computers (e.g., via an interface of the sort discussed above) whether or not participation in the interactive session was desired (step 105). The nodes and/or other computers could, in various embodiments, report such user choice to the node and/or other computer of the initiating user (step 107). It is noted that, in various embodiments, in the case where a user of an invited node and/or other computer did not indicate her desire to participate or not participate to her node and/or other computer, and/or in the case where the invited node and/or other computer did not reply to the node and/or other computer of the initiating user, the node and/or other computer of the initiating user might make an assumption about the desire of the user of invited node and/or other computer. For example, the node and/or other computer of the initiating user might assume that the user of the invited node and/or other computer did not wish to participate. Alternately or additionally, the node and/or other computer of the initiating user might assume that the user of the invited node and/or other computer did wish to participate.

Such communications to and/or from the node and/or other computer of the initiating user and one or more invited nodes and/or other computers might be implemented in a number of ways. For example, Bluetooth, Wireless Fidelity (WiFi), Infrared Data Association (IrDA), General Packet Radio Service (GPRS), Universal Mobile Telecommunications Service (UMTS), Ultra Wide Band (UWB), Global System for Mobile Communications (GSM), wired network (e.g., Ethernet), Remote Method Invocation (RMI), Java Messaging Service (JMS), Simple Object Access Protocol (SOAP), Remote Procedure Call (RPC), sockets, pipes, Object Exchange (OBEX) Object Push Profile (OPP), email, Multimedia Messaging Service (MMS), Short Message Service (SMS), Hypertext Transfer Protocol (HTTP), Real-time Transport Protocol (RTP), and/or Session Initiation Protocol (SIP) might be employed. Such WiFi might, for instance, be IEEE 802.11b and/or IEEE 802.11g. It is noted that, in various embodiments, there may be multiple initiating users and/or corresponding nodes and/or other computers.

It is noted that, in various embodiments, the above-discussed invitation and/or response functionality might not be employed.

Ability Provision Operations

In various embodiments the node and/or other computer of the initiating user, perhaps after having come to determine the other nodes and/or other computers that will participate in the interactive session (e.g., in accordance with indication by the initiating user, and/or in accordance with replies and/or absence thereof received from invited nodes and/or other computers), might, for example, perform one or more operations to provide to one or more of the other nodes and/or other computers to participate in the session ability to employ software (e.g., gaming and/or communications software). Such functionality may be implemented in a number of ways.

For example the node and/or other computer of the initiating user might send to one or more of the other nodes and/or other computers to participate in the interactive session the software to be used for the interactive session. Such software might, in various embodiments, be provided as one or more Symbian OS Installer File (SIS) files, and/or as one or more Java files (e.g., .class and/or .jar files).

Figure 2:
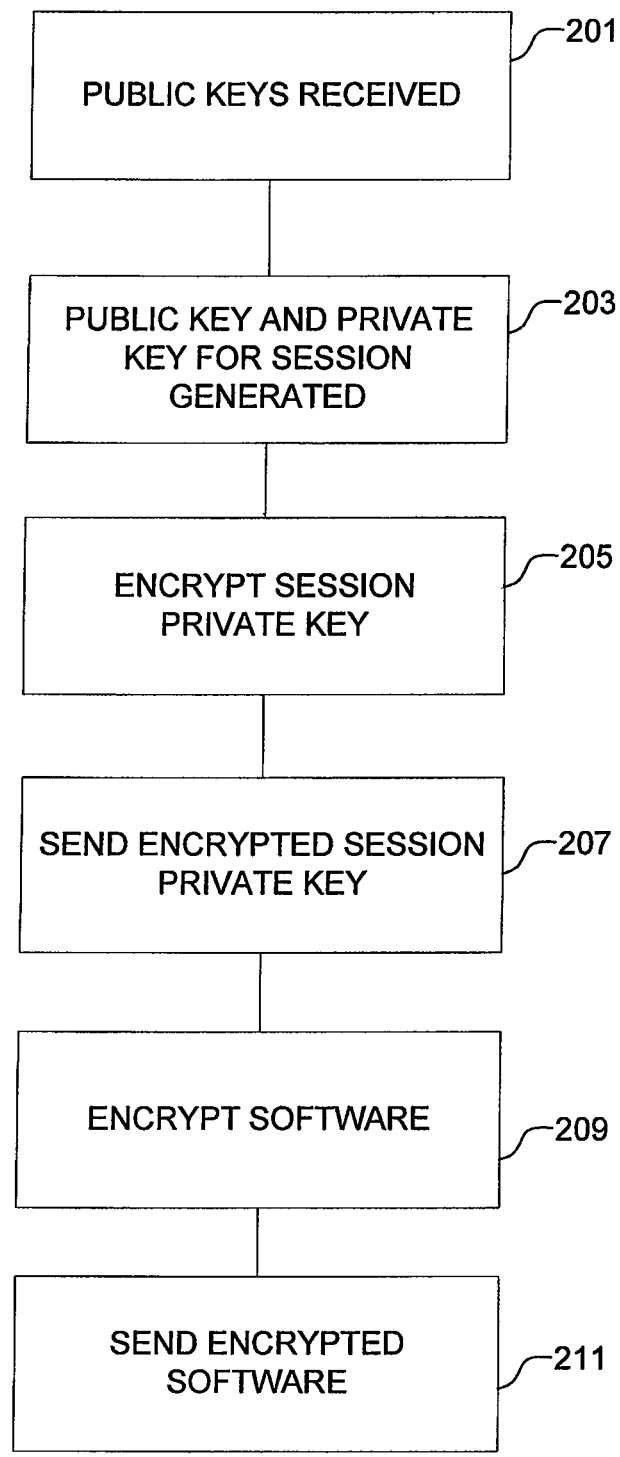
FIG. 2. shows exemplary steps involved in ability provision operations according to various embodiments of the present invention.

With respect to FIG. 2 it is noted that, as another example, the node and/or other computer of the initiating user might, alternately or additionally, receive from each of one or more of the nodes and/or other computers to participate in the interactive session corresponding public keys (step 201). The node and/or other computer of the initiating user might then, for instance, generate a private key and a public key for the interactive session (step 203).

The node and/or other computer of the initiating user might then, for example, send to one or more of the nodes and/or other computers to participate in the interactive session the private key for the session (step 207), with the node and/or other computer of the initiating user encrypting the session private key for each node and/or other computer to which it is sent using the appropriate received corresponding public key (step 205). To illustrate by way of example, in the case where the node and/or other computer of the initiating user is to send the session private key to a first node and/or other computer and to a second node and/or other computer, the node and/or other computer of the initiating user might send the session private key, encrypted using the first node and/or other computer's public key, to the first node and/or other computer, and might send the session private key, encrypted using the second node and/or other computer's public key, to the second node and/or other computer.

The node and/or other computer of the initiating user might then, for instance, encrypt the software to be used for the interactive session using the public key for the session (step 209), and send the encrypted software to one or more of the other nodes and/or other computers to participate in the interactive session (step 211). The encrypted software might, for example, be sent as a single file. As another example, the encrypted software might be sent as multiple files. It is noted that, in various embodiments, the encrypted software might be made up of one or more encrypted SIS and/or Java files (e.g., of the sort discussed above).

It is noted that, in various embodiments, in the case where a node and/or other computer to participate in the interactive session already possessed the encrypted software (e.g., in an accessible store), the encrypted software might not be sent again. The node and/or other computer of the initiating user might, for example, retrieve (e.g., from an accessible store) and/or regenerate a session private key corresponding to the encrypted software as held at the node and/or other computer to participate in the session, and might send that session private key to the node and/or other computer to participate in the session. Such sending might, for instance, be performed as discussed above. The node and/or other computer of the initiating user might, in various embodiments, communicate with the node and/or other computer to participate in the session to determine if that node and/or other computer already possessed the encrypted software.

Figure 3:
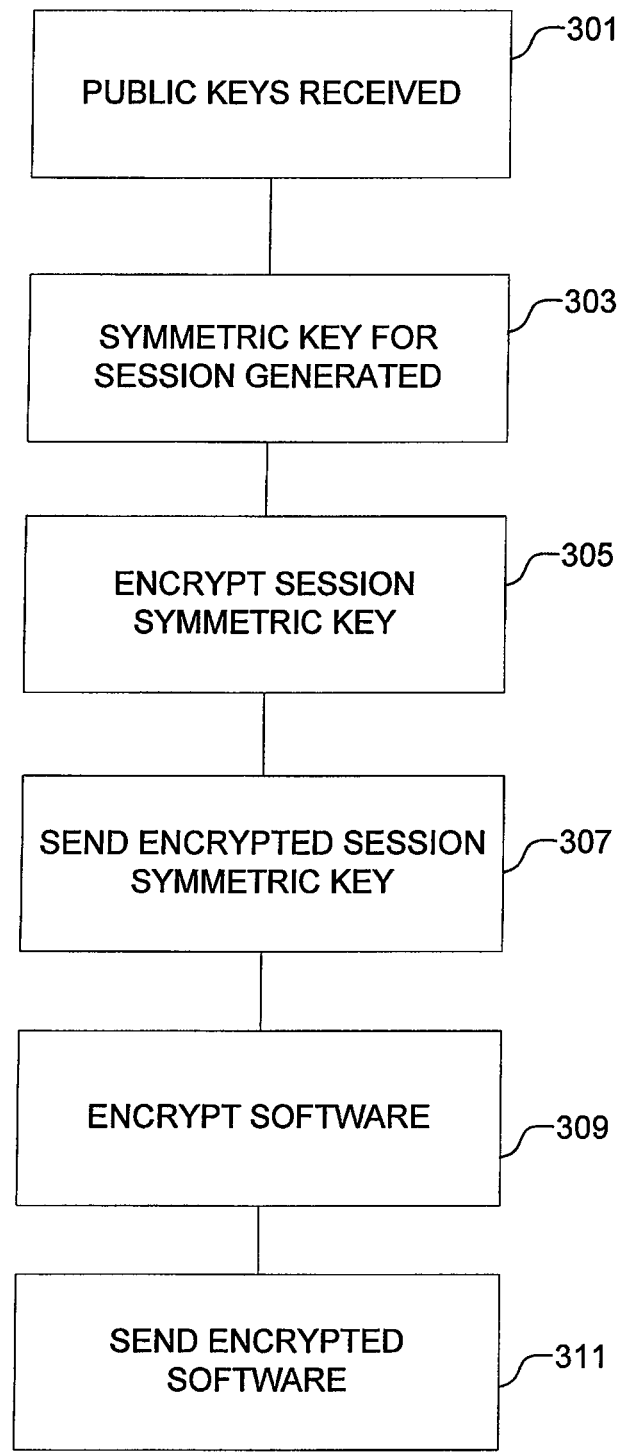
FIG. 3. shows further exemplary steps involved in ability provision operations according to various embodiments of the present invention.

With respect to FIG. 3 it is noted that, as yet another example, the node and/or other computer of the initiating user might, alternately or additionally, receive from each of one or more of the nodes and/or other computers to participate in the interactive session corresponding public keys (step 301), and then generate a symmetric key for the interactive session (step 303). The node and/or other computer of the initiating user might then, for instance, send to one or more of the nodes and/or other computers to participate in the interactive session the session symmetric key (step 307), with the node and/or other computer of the initiating user encrypting the session symmetric key for each node and/or other computer to which it is sent using the appropriate received corresponding public key (step 305). To illustrate by way of example, in the case where the node and/or other computer of the initiating user is to send the session symmetric key to a first node and/or other computer and to a second node and/or other computer, the node and/or other computer of the initiating user might send the session symmetric key, encrypted using the first node and/or other computer's public key, to the first node and/or other computer, and might send the session symmetric key, encrypted using the second node and/or other computer's public key, to the second node and/or other computer.

The node and/or other computer of the initiating user might, for example, then encrypt the software to be used for the interactive session using the session symmetric key (step 309). The node and/or other computer of the initiating user might then, for instance, send the encrypted software (e.g., via single and/or multiple files) to one or more of the other nodes and/or other computers to participate in the interactive session (step 311). It is noted that, in various embodiments, the encrypted software might be made up of one or more encrypted SIS and/or Java files (e.g., of the sort discussed above).

In various embodiments, in the case where a node and/or other computer to participate in the interactive session already possessed the encrypted software, the encrypted software might not be sent to that node and/or other computer again. Such functionality might, for instance, be performed in a manner analogous to that discussed above.

It is noted that, in various embodiments, some or all of the above-discussed ability provision communications between nodes and/or other computers (e.g., sending of software and/or keys) might be implemented in a manner employing, for example, Bluetooth, WiFi, IrDA, GPRS, UMTS, UWB, GSM, wired network, RMI, JMS, SOAP, RPC, sockets, pipes, OBEX OPP, email, MMS, SMS, HTTP, RTP, and/or SIP.

It is further noted that, in various embodiments, one or more of the above-discussed ability provision operations might be performed during and/or subsequent to interactive session initiation (e.g., SIP initiation).

It is additionally noted that, in various embodiments, one or more ability provision operations discussed as being performed by the node and/or other computer of the initiating user might alternately or additionally be performed by one or more other nodes and/or other computers (e.g., a node and/or other computer whose user owned the software to be employed in the session in the case where the initiating user was not an owner).

Moreover, it is noted that, in various embodiments, where the use of single keys is described herein, multiple keys may alternately or additionally be used, and vice versa. For example, multiple session private keys and/or multiple session symmetric keys might, in various embodiments, be employed.

Software Employment Operations and Ability Loss Operations

Figure 4:
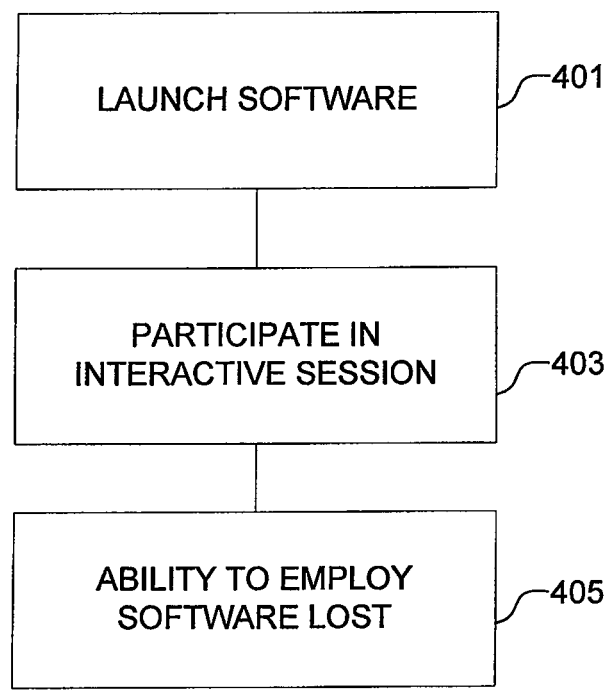
FIG. 4 shows exemplary steps involved in software employment operations and ability loss operations according to various embodiments of the present invention.

A node and/or other computer that has, perhaps as discussed above, received ability to employ software (e.g., gaming and/or communications software) might, in various embodiments, perform one or more operations to make use of that ability. With respect to FIG. 4 it is noted that, for example, in various embodiments the node and/or other computer might launch corresponding software (step 401).

As indicated above, a node and/or other computer that has received ability to employ software might, in various embodiments, possess encrypted software and one or more corresponding keys (e.g., one or more session private keys and/or one or more session symmetric keys). Accordingly, the node and/or other computer might, in launching the software, apply the one or more keys.

Having launched the software, the node and/or other computer might, for instance, employ the software to participate in the interactive session (step 403). Accordingly, for example, the node and/or other computer might, via employment of the software, interact with others nodes and/or other computers participating in the session that have also launched the software. To illustrate by way of example, in the case where the software is gaming software, the users of the nodes and/or other computers participating in the session might play a multiplayer game using the software.

As another illustrative example, in the case where the software is communications software, the users of the nodes and/or other computers participating in the session might communicate with one another using the software. Such communications software might, for instance, allow for audio, video, and/or textual communications.

Communication among nodes and/or other computers employing the software in participating in the session might be implemented in a number of ways. For example, Bluetooth, WiFi, IrDA, GPRS, UMTS, UWB, GSM, wired network, RMI, JMS, SOAP, RPC, sockets, pipes, OBEX OPP, email, MMS, SMS, HTTP, RTP, and/or SIP might be employed.

With, for instance, interactive session termination (e.g., SIP termination), one or more operations might, in various embodiments, be performed so that nodes and/or other computers that had previously received ability to employ software lose that ability (step 405). As illustrative examples, interactive session termination might involve ending of an interactive game and/or ending of communication among users via their nodes and/or other computers. It is noted that, in various embodiments, an interactive session might be considered to be terminated in the case where none of the nodes and/or other computers remaining in the session were nodes and/or other computers whose users were owners of the software being employed for the session.

Such functionality might be implemented in a number of ways. For example, software that had been provided to a node and/or other computer (e.g., as discussed above), might be removed from the node and/or other computer with termination of the interactive session. Alternately or additionally, one or more keys for accessing encrypted software (e.g., one or more session private keys and/or one or more session symmetric keys) might, for instance, be removed from the node and/or other computer with termination of the interactive session.

Removal functionality might be implemented in a number of ways. For example, in various embodiments provision of ability to employ software to a node and/or other computer might include directive that removal of the sort discussed above occur with termination of the interactive session, and the node and/or other computer could comply with such directive. Such functionality might, in various embodiments, be implemented in a manner that acted to prevent individuals (e.g., the node and/or other computer's user) from stopping removal. For example, the directive might be hidden and/or encrypted, and/or removal might run as a hidden and/or user-unstoppable process.

As another example, in various embodiments with termination of the interactive session, one or more nodes and/or other computers (e.g., nodes and/or other computers having users owning the software employed for the session) might send a removal instruction to one or more nodes and/or other computers that had received ability to employ the software. Such an instruction might, for example, be sent in a manner employing Bluetooth, WiFi, IrDA, GPRS, UMTS, UWB, GSM, wired network, RMI, JMS, SOAP, RPC, sockets, pipes, OBEX OPP, email, MMS, SMS, HTTP, RTP, and/or SIP. Such instruction functionality, might in various embodiments, be implemented in a manner that acted to prevent individuals (e.g., the user of the node and/or other computer that had received ability) from stopping removal. For example, the instruction might be sent in a hidden and/or encrypted manner.

In various embodiments, functionality might be implemented to prevent a node and/or other computer that has received ability to employ software from performing backup during the interactive session. Such functionality might, for example, help prevent the node and/or other computer's user from extracting received keys and/or unencrypted software from the node and/or other computer prior to their deletion with termination of the session.

It is noted that, in various embodiments, one or more keys for accessing encrypted software might be removed from a node and/or other computer that has received ability to employ software, but the corresponding encrypted software might be allowed to remain. Such operation might, for instance, strive for time, communications, and/or cost savings in future interactive sessions, as only the one or more keys, and not the software itself, would need to be sent.

It is further noted that various operations discussed herein might, in various embodiments, allow for benefits such as, for instance, allowing a node and/or other computer user owning software to participate in an interactive session with node and/or other computer users that did not own that software without those users having to purchase or otherwise come to be proper owners the software, while preventing those node and/or other computer users from retaining copies of that software. Moreover, it is noted that, in various embodiments, various operations discussed herein might be employed as forms of Digital Rights Management (DRM).

It is additionally noted that, in various embodiments, it might be possible for decision to be made as to whether or not ability to employ particular software could be provided to nodes and/or other computers of users not owning that software. Such a decision might, for instance, be made by a system administrator, a service provider, and/or a software provider.

Hardware and Software

Various operations and/or the like described herein may, in various embodiments, be executed by and/or with the help of computers. Further, for example, devices and/or items described herein may be and/or may incorporate computers. The phrases "computer", "general purpose computer", and the like, as used herein, refer but are not limited to a smart card, a media device, a personal computer, an engineering workstation, a PC, a Macintosh, a PDA, a portable computer, a computerized watch, a wired or wireless terminal, phone, communication device, node, and/or the like, a server, a network access point, a network multicast point, a network device, a set-top box, a personal video recorder (PVR), a game console, a portable game device, a portable audio device, a portable media device, a portable video device, a television, a digital camera, a digital camcorder, a Global Positioning System (GPS) receiver, a wireless personal sever, or the like, or any combination thereof, perhaps running an operating system such as OS X, Linux, Darwin, Windows CE, Windows XP, Windows Server 2003, Palm OS, Symbian OS, or the like, perhaps employing the Series 40 Platform, Series 60 Platform, Series 80 Platform, and/or Series 90 Platform, and perhaps having support for Java and/or Net.

Figure 5:
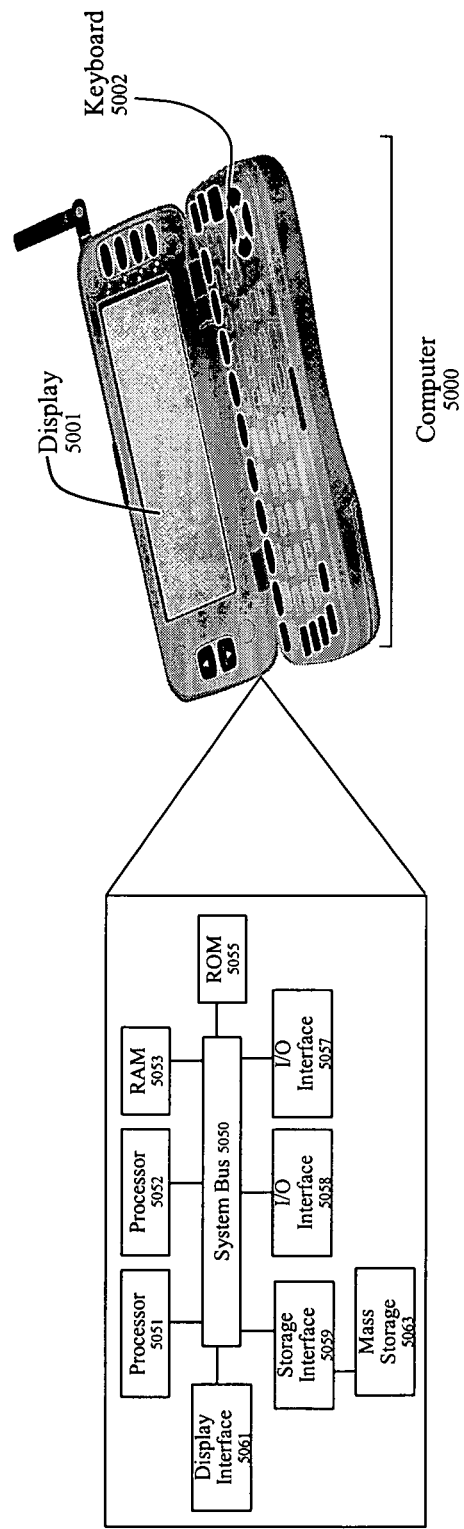
FIG. 5 shows an exemplary computer.

The phrases "general purpose computer", "computer", and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Shown in FIG. 5 is an exemplary computer employable in various embodiments of the present invention. Exemplary computer 5000 includes system bus 5050 which operatively connects two processors 5051 and 5052, random access memory 5053, read-only memory 5055, input output (I/O) interfaces 5057 and 5058, storage interface 5059, and display interface 5061. Storage interface 5059 in turn connects to mass storage 5063. Each of I/O interfaces 5057 and 5058 may, for example, be an Ethernet, IEEE 1394, IEEE 1394b, IEEE 802.11a, IEEE 802.11b, IEEE 802.11g, IEEE 802.11i, IEEE 802.11e, IEEE 802.11n, IEEE 802.15a, IEEE 802.16a, IEEE 802.16d, IEEE 802.16e, IEEE 802.16x, IEEE 802.20, IEEE 802.15.3, ZigBee, Bluetooth, Ultra Wide Band (UWB), Wireless Universal Serial Bus (WUSB), wireless Firewire, terrestrial digital video broadcast (DVB-T), satellite digital video broadcast (DVB-S), Advanced Television Systems Committee (ATSC), Integrated Services Digital Broadcasting (ISDB), Digital Multimedia Broadcast-Terrestrial (DMB-T), MediaFLO (Forward Link Only), Terrestrial Digital Multimedia Broadcasting (T-DMB), Digital Audio Broadcast (DAB), Digital Radio Mondiale (DRM), General Packet Radio Service (GPRS), Universal Mobile Telecommunications Service (UMTS), Global System for Mobile Communications (GSM), Code Division Multiple Access 2000 (CDMA2000), DVB-H (Digital Video Broadcasting: Handhelds), IrDA (Infrared Data Association), and/or other interface.

Mass storage 5063 may be a hard drive, optical drive, a memory chip, or the like. Processors 5051 and 5052 may each be a commonly known processor such as an IBM or Freescale PowerPC, an AMD Athlon, an AMD Opteron, an Intel ARM, an Intel XScale, a Transmeta Crusoe, a Transmeta Efficeon, an Intel Xenon, an Intel Itanium, an Intel Pentium, or an IBM, Toshiba, or Sony Cell processor. Computer 5000 as shown in this example also includes a touch screen 5001 and a keyboard 5002. In various embodiments, a mouse, keypad, and/or interface might alternately or additionally be employed. Computer 5000 may additionally include or be attached to card readers, DVD drives, floppy disk drives, hard drives, memory cards, ROM, and/or the like whereby media containing program code (e.g., for performing various operations and/or the like described herein) may be inserted for the purpose of loading the code onto the computer.

In accordance with various embodiments of the present invention, a computer may run one or more software modules designed to perform one or more of the above-described operations. Such modules might, for example, be programmed using languages such as Java, Objective C, C, C#, C++, Perl, Python, and/or Comega according to methods known in the art. Corresponding program code might be placed on media such as, for example, DVD, CD-ROM, memory card, and/or floppy disk. It is noted that any described division of operations among particular software modules is for purposes of illustration, and that alternate divisions of operation may be employed. Accordingly, any operations discussed as being performed by one software module might instead be performed by a plurality of software modules. Similarly, any operations discussed as being performed by a plurality of modules might instead be performed by a single module. It is noted that operations disclosed as being performed by a particular computer might instead be performed by a plurality of computers. It is further noted that, in various embodiments, peer-to-peer and/or grid computing techniques may be employed. It is additionally noted that, in various embodiments, remote communication among software modules may occur. Such remote communication might, for example, involve Simple Object Access Protocol (SOAP), Java Messaging Service (JMS), Remote Method Invocation (RMI), Remote Procedure Call (RPC), sockets, and/or pipes.

Figure 6:
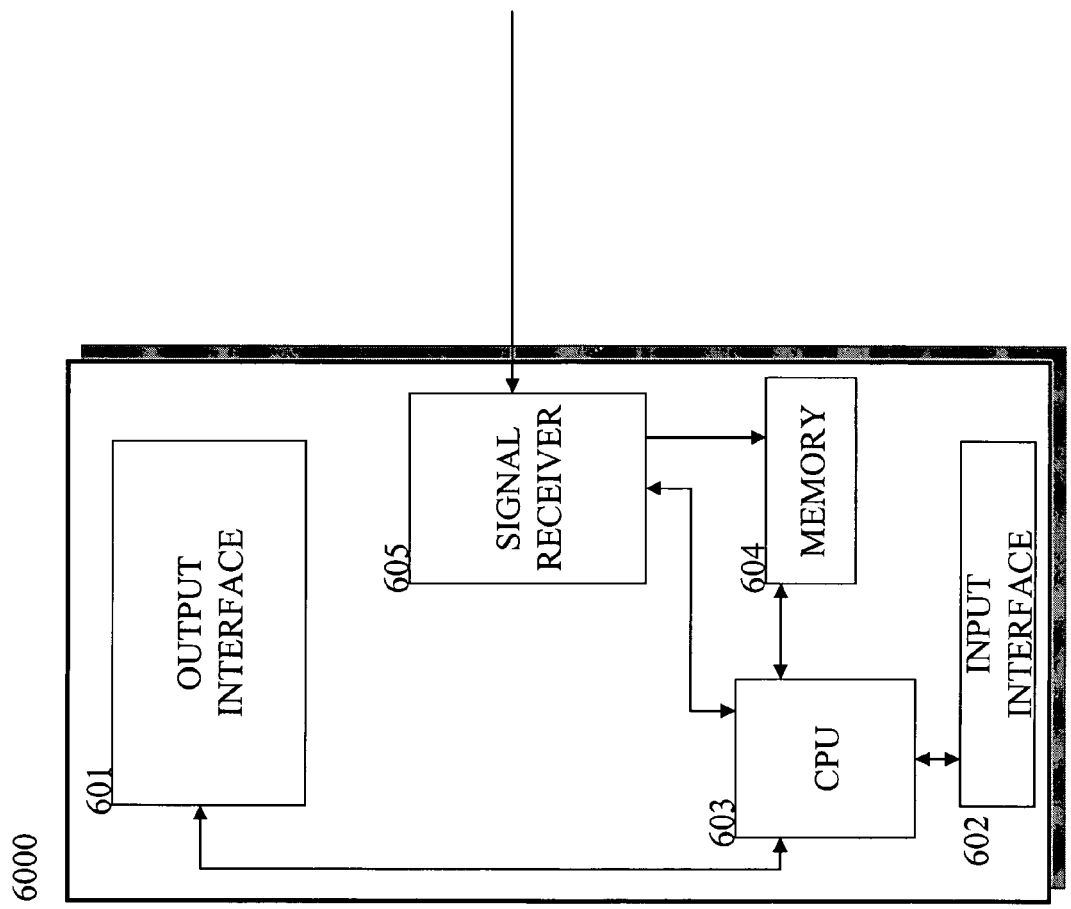
FIG. 6 shows a further exemplary computer.

Shown in FIG. 6 is a block diagram of a terminal, an exemplary computer employable in various embodiments of the present invention. In the following, corresponding reference signs are applied to corresponding parts. Exemplary terminal 6000 of FIG. 6 comprises a processing unit CPU 603, a signal receiver 605, and a user interface (601, 602). Signal receiver 605 may, for example, be a single-carrier or multi-carrier receiver. Signal receiver 605 and the user interface (601, 602) are coupled with the processing unit CPU 603. One or more direct memory access (DMA) channels may exist between multi-carrier signal terminal part 605 and memory 604. The user interface (601, 602) comprises a display and a keyboard to enable a user to use the terminal 6000. In addition, the user interface (601, 602) comprises a microphone and a speaker for receiving and producing audio signals. The user interface (601, 602) may also comprise voice recognition (not shown).

The processing unit CPU 603 comprises a microprocessor (not shown), memory 604 and possibly software. The software can be stored in the memory 604. The microprocessor controls, on the basis of the software, the operation of the terminal 6000, such as receiving of a data stream, tolerance of the impulse burst noise in data reception, displaying output in the user interface and the reading of inputs received from the user interface. The hardware contains circuitry for detecting signal, circuitry for demodulation, circuitry for detecting impulse, circuitry for blanking those samples of the symbol where significant amount of impulse noise is present, circuitry for calculating estimates, and circuitry for performing the corrections of the corrupted data.

Still referring to FIG. 6, alternatively, middleware or software implementation can be applied. The terminal 6000 can, for instance, be a hand-held device which a user can comfortably carry. The terminal 6000 can, for example, be a cellular mobile phone which comprises the multi-carrier signal terminal part 605 for receiving multicast transmission streams. Therefore, the terminal 6000 may possibly interact with the service providers.

It is noted that various operations and/or the like described herein may, in various embodiments, be implemented in hardware (e.g., via one or more integrated circuits). For instance, in various embodiments various operations and/or the like described herein may be performed by specialized hardware, and/or otherwise not by one or more general purpose processors. One or more chips and/or chipsets might, in various embodiments, be employed. In various embodiments, one or more Application-Specific Integrated Circuits (ASICs) may be employed.

Ramifications and Scope

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

In addition, the embodiments, features, methods, systems, and details of the invention that are described above in the application may be combined separately or in any combination to create or describe new embodiments of the invention.

What is claimed is:

1. A method, comprising:
    initiating a user apparatus interactive session employing initiator-unowned software, wherein one or more invitation messages are sent;
    receiving transmission of invitee-user-apparatus-provided software or keys and ability to employ said initiator-unowned software, wherein the invitee-user-apparatus-provided ability to employ said initiator-unowned software includes a removal directive specifying removal of the received software or keys from the user apparatus, with termination of the interactive session, of the invitee-user-apparatus-provided ability to employ said initiator-unowned software;
    determining to use the invitee-user-apparatus-provided ability to employ said initiator-unowned software during said user apparatus interactive session; and
    losing in accordance with said directive, with termination of the interactive session, the invitee-user-apparatus-provided ability to employ said initiator-unowned software, and
    wherein retention of the invitee-user-apparatus-provided ability to employ said initiator-unowned software is prevented.

2. The method of claim 1, wherein the ability is received during initiation of the interactive session.

3. The method of claim 1, wherein the ability is received subsequent to initiation of the interactive session.

4. The method of claim 1, wherein the interactive session employs session initiation protocol.

5. The method of claim 1, wherein the interactive session is a gaming session.

6. The method of claim 1, wherein the interactive session is a communications session.

7. A method, comprising:
    receiving initiation of a user apparatus interactive session employing initiator-unowned software, wherein an invitation message is received;
    determining to transmit invitee-user-apparatus-provided software or keys and ability to employ said initiator-unowned software, wherein the invitee-user-apparatus-provided ability to employ said initiator-unowned software includes a removal directive specifying removal of the received software or keys from the user apparatus, with termination of the interactive session, of the invitee-user-apparatus-provided ability to employ said initiator-unowned software;
    determining to participate in said user apparatus interactive session, wherein the invitee-user-apparatus-provided ability to employ said initiator-unowned software is used in the interactive session; and
    wherein, with termination of the interactive session, there is loss, in accordance with said directive, of the invitee-user-apparatus-provided ability to employ said initiator-unowned software, and
    wherein retention of the invitee-user-apparatus-provided ability to employ said initiator-unowned software is prevented.

8. The method of claim 7, wherein the ability is sent during initiation of the interactive session.

9. The method of claim 7, wherein the ability is sent subsequent to initiation of the interactive session.

10. The method of claim 7, wherein the interactive session employs session initiation protocol.

11. The method of claim 7, wherein the interactive session is a gaming session.

12. The method of claim 7, wherein the interactive session is a communications session.

13. A user apparatus, comprising:
    at least one processor; and
    at least one memory including computer program code, the at least one memory and the computer program code configured to, with the at least one processor, cause the user apparatus at least to perform:
    initiate a user apparatus interactive session employing initiator-unowned software, wherein one or more invitation messages are sent;
    receive transmission of invitee-user-apparatus-provided software or keys and ability to employ said initiator-unowned software, wherein the invitee-user-apparatus-provided ability to employ said initiator-unowned software includes a removal directive specifying removal of the received software or keys from the user apparatus, with termination of the interactive session, of the invitee-user-apparatus-provided ability to employ said initiator-unowned software;

determine to use the invitee-user-apparatus-provided ability to employ said initiator-unowned software during said user apparatus interactive session; and lose in accordance with said directive, with termination of the interactive session, the invitee-user-apparatus-provided ability to employ said initiator-unowned software, and wherein retention of the invitee-user-apparatus-provided ability to employ said initiator-unowned software is prevented.

14. The apparatus of claim 13, wherein the ability is received during initiation of the interactive session.

15. The apparatus of claim 13, wherein the ability is received subsequent to initiation of the interactive session.

16. The apparatus of claim 13, wherein the interactive session employs session initiation protocol.

17. The apparatus of claim 13, wherein the interactive session is a gaming session.

18. The apparatus of claim 13, wherein the interactive session is a communications session.

19. A user apparatus, comprising:
at least one processor; and
at least one memory including computer program code, the at least one memory and the computer program code configured to, with the at least one processor, cause the user apparatus at least to perform:
receive initiation of a user apparatus interactive session employing initiator-unowned software, wherein an invitation message is received;
determine to transmit invitee-user-apparatus-provided software or keys and ability to employ said initiator-unowned software, wherein the invitee-user-apparatus-provided ability to employ said initiator-unowned software includes a removal directive specifying removal of the received software or keys from the user apparatus, with termination of the interactive session, of the invitee-user-apparatus-provided ability to employ said initiator-unowned software;
determine to participate in said user apparatus interactive session, wherein the invitee-user-apparatus-provided ability to employ said initiator-unowned software is used in the interactive session; and
wherein, with termination of the interactive session, there is loss, in accordance with said directive, of the invitee-user-apparatus-provided ability to employ said initiator-unowned software, and
wherein retention of the invitee-user-apparatus-provided ability to employ said initiator-unowned software is prevented.

20. The apparatus of claim 19, wherein the ability is sent during initiation of the interactive session.

21. The apparatus of claim 19, wherein the ability is sent subsequent to initiation of the interactive session.

22. The apparatus of claim 19, wherein the interactive session employs session initiation protocol.

23. The apparatus of claim 19, wherein the interactive session is a gaming session.

24. The apparatus of claim 19, wherein the interactive session is a communications session.

25. A user apparatus, comprising:
at least one processor;
at least one network interface; and
at least one memory including computer program code, the at least one memory and the computer program code configured to, with the at least one processor, cause the user apparatus at least to perform:
initiate a user apparatus interactive session employing initiator-unowned software, wherein one or more invitation messages are sent;
receive transmission of invitee-user-apparatus-provided software or keys and ability to employ said initiator-unowned software, wherein the invitee-user-apparatus-provided ability to employ said initiator-unowned software includes a removal directive specifying removal of the received software or keys from the user apparatus, with termination of the interactive session, of the invitee-user-apparatus-provided ability to employ said initiator-unowned software;
determine to use the invitee-user-apparatus-provided ability to employ said initiator-unowned software during said user apparatus interactive session; and
lose in accordance with said directive, with termination of the interactive session, the invitee-user-apparatus-provided ability to employ said initiator-unowned software, and
wherein retention of the invitee-user-apparatus-provided ability to employ said initiator-unowned software is prevented.

26. A user apparatus, comprising:
at least one processor;
at least one network interface; and
at least one memory including computer program code, the at least one memory and the computer program code configured to, with the at least one processor, cause the user apparatus at least to perform:
receive initiation of a user apparatus interactive session employing initiator-unowned software, wherein an invitation message is received;
determine to transmit invitee-user-apparatus-provided software or keys and ability to employ said initiator-unowned software, wherein the invitee-user-apparatus-provided ability to employ said initiator-unowned software includes a removal directive specifying removal of the received software or keys from the user apparatus, with termination of the interactive session, of the invitee-user-apparatus-provided ability to employ said initiator-unowned software;
determine to participate in said user apparatus interactive session, wherein the invitee-user-apparatus-provided ability to employ said initiator-unowned software is used in the interactive session; and
wherein, with termination of the interactive session, there is loss, in accordance with said directive, of the invitee-user-apparatus-provided ability to employ said initiator-unowned software, and
wherein retention of the invitee-user-apparatus-provided ability to employ said initiator-unowned software is prevented.

27. A computer program product comprising computer executable program code recorded on a non-transitory computer readable storage medium, the computer executable program code comprising:
code for causing initiation of a user apparatus interactive session employing initiator-unowned software, wherein one or more invitation messages are sent;
code for causing receipt of transmission of invitee-user-apparatus-provided software or keys and ability to employ said initiator-unowned software, wherein the invitee-user-apparatus-provided ability to employ said initiator-unowned software includes a removal directive specifying removal of the received software or keys from the user apparatus, with termination of the interactive session, of the invitee-user-apparatus-provided ability to employ said initiator-unowned software;

code for causing determination to use the invitee-user-apparatus-provided ability to employ said initiator-unowned software during said user apparatus interactive session; and code for causing loss in accordance with said directive, with termination of the interactive session, of the invitee-user-apparatus-provided ability to employ said initiator-unowned software, and wherein retention of the invitee-user-apparatus-provided ability to employ said initiator-unowned software is prevented.

28. A computer program product comprising computer executable program code recorded on a non-transitory computer readable storage medium, the computer executable program code comprising:

code for causing receipt of initiation of a user apparatus interactive session employing initiator-unowned software, wherein an invitation message is received;

code for causing determination to transmit invitee-user-apparatus-provided software or keys and ability to employ said initiator-unowned software, wherein the invitee-user-apparatus-provided ability to employ said initiator-unowned software includes a removal directive specifying removal of the received software or keys from the user apparatus, with termination of the interactive session, of the invitee-user-apparatus-provided ability to employ said initiator-unowned software;

code for causing determination to participate in said user apparatus interactive session, wherein the invitee-user-apparatus-provided ability to employ said initiator-unowned software is used in the interactive session; and wherein, with termination of the interactive session, there is loss, in accordance with said directive, of the invitee-user-apparatus-provided ability to employ said initiator-unowned software, and wherein retention of the invitee-user-apparatus-provided ability to employ said initiator-unowned software is prevented.

* * * * *